(12) United States Patent
Vandenhende et al.

(10) Patent No.: US 6,172,125 B1
(45) Date of Patent: Jan. 9, 2001

(54) PROCESS FOR RECYCLING ARTICLES BASED ON VINYL CHLORIDE POLYMERS

(75) Inventors: Bernard Vandenhende, Leest; Jean-Marie Yernaux, Rixensart, both of (BE); Jacques Scheffer, Charly (FR)

(73) Assignee: Solvay S.A. (Societe Anonyme), Brussels (BE)

( * ) Notice: Under 35 U.S.C. 154(b), the term of this patent shall be extended for 0 days.

(21) Appl. No.: 09/271,862

(22) Filed: Mar. 18, 1999

(30) Foreign Application Priority Data

Mar. 26, 1998 (FR) .................................................. 98 03884
Oct. 29, 1998 (FR) .................................................. 98 13626

(51) Int. Cl.$^7$ ..................................................... C08J 11/04
(52) U.S. Cl. ........................... 521/46.5; 521/48; 528/500; 528/501
(58) Field of Search .................... 521/46.5, 48; 528/500, 528/501

(56) References Cited

U.S. PATENT DOCUMENTS

| 3,624,009 | 11/1971 | Sussman et al. . | |
|---|---|---|---|
| 3,772,262 | 11/1973 | Clementi et al. | ................... 260/94.7 |
| 3,912,664 | 10/1975 | Wainer . | |
| 5,674,914 | 10/1997 | Abe et al. | ........................... 521/46.5 |

FOREIGN PATENT DOCUMENTS

| 617788 | 4/1961 | (CA) . | |
|---|---|---|---|
| 2122195 | 8/1972 | (FR) . | |
| 52-084260 | 1/1976 | (JP) . | |
| 05117198 | 5/1993 | (JP) | .......................... 49/10 |

*Primary Examiner*—Edward J. Cain
(74) *Attorney, Agent, or Firm*—Venable; George H. Spencer; Marina V. Schneller

(57) ABSTRACT

Process for recycling an article based on at least one vinyl chloride polymer, in which:

(a) the article is shredded into fragments having an average dimension of 1 cm to 50 cm, should it exceed these dimensions;

(b) the fragments of the article, which are substantially dry, are brought into contact with a substantially anhydrous solvent capable of dissolving the vinyl chloride polymer, forming an azeotrope with water;

(c) the polymer dissolved in the solvent is precipitated by injecting steam in the solution thus obtained, which moreover leads to the stripping of the water-solvent azeotrope and so leaves behind a mixture essentially consisting of water and of solid polymer particles;

(d) the polymer particles are recovered.

10 Claims, 1 Drawing Sheet

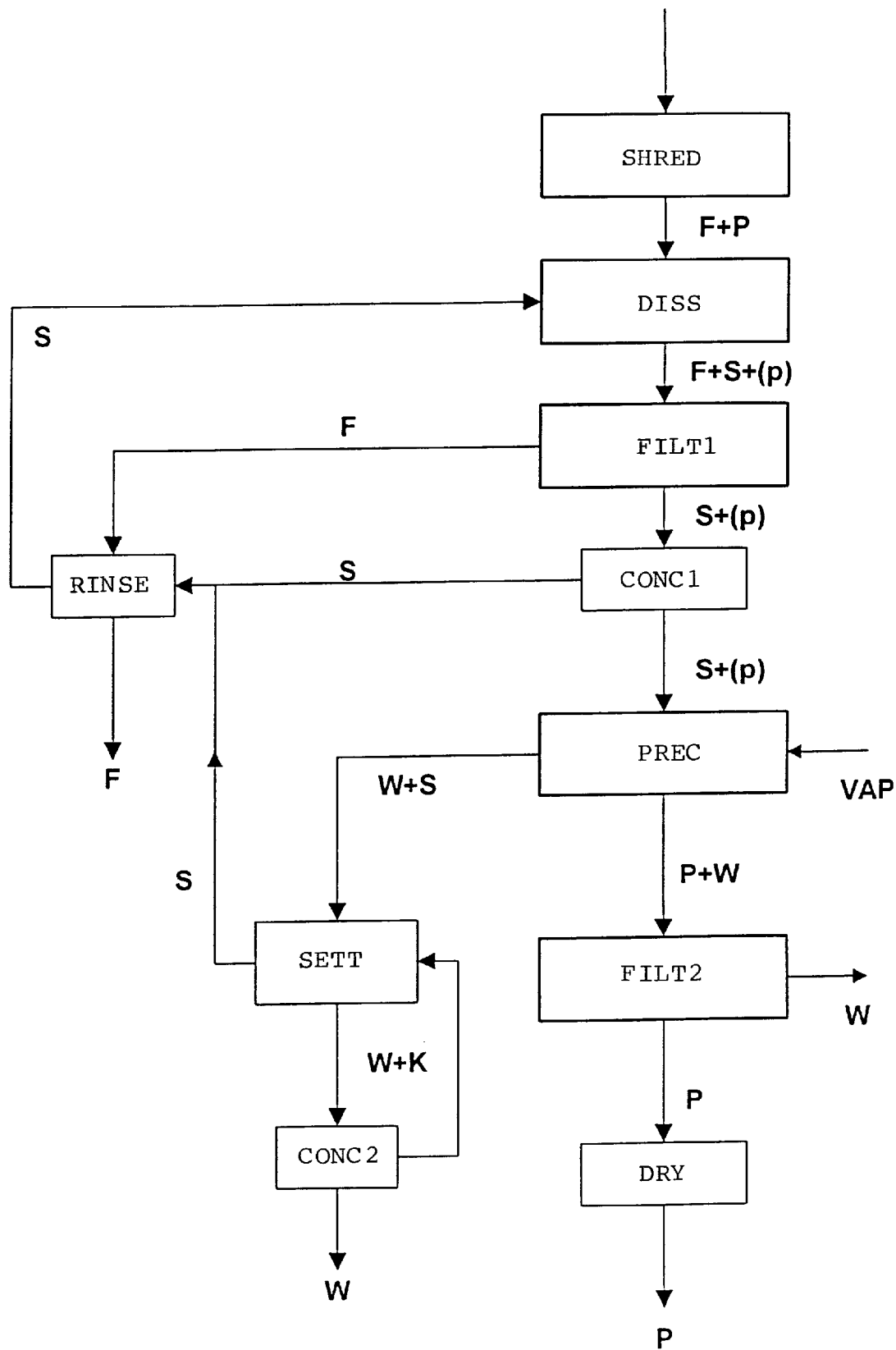

PROCESS FOR RECYCLING ARTICLES BASED ON VINYL CHLORIDE POLYMERS

The present invention relates to a process for the recycling of articles, and in particular of sheets, based on vinyl chloride polymers.

Vinyl chloride polymers, and in particular polyvinyl chloride (PVC), are widely used for the manufacture of a variety of articles. They are used, for example, for the manufacture of sheets—generally reinforced with reinforcing fibres—intended for the covering of vehicles, for the concealing of buildings on which work is being carried out, for the construction of sets for entertainments or exhibitions, or for advertizing purposes. These sheets generally have a large surface area. Furthermore, in many applications, most particularly in advertising applications or in applications involving sets for entertainments or exhibitions, which at the present time are growing considerably, their lifetime is short, typically a few weeks or months. For these reasons, large quantities of such sheets are scrapped each year. The process of recycling them consequently constitutes a major ecological and economic problem.

The same situation applies with regard to other articles based on one or more, flexible or rigid, vinyl chloride polymers, for example with regard to conveyor belts, coated fabrics and other elements for the interior furnishing of vehicles, pipes and hoses, window frames or polymer-insulated power cables.

Thorough grinding of these articles usually results in a mixture of fine particles of heterogeneous composition, which is difficult to purify and reuse. Furthermore, in the case of fibre-reinforced articles (for example, polyester-fibre-reinforced articles), the fibres often form a kind of wadding which makes it much more complicated to reuse the ground particles.

Various processes based on dissolving, using organic solvents, have already been proposed; however, they often cause safety and pollution problems. Furthermore, they do not always make it possible to recover plastics of sufficient purity to allow them to be re-utilized from an advantageous economic standpoint. Another drawback of these methods is that they generally cause the additives (e.g. plasticizers) contained in vinyl chloride polymers to be extracted, this having the effect of preventing them from being reused directly. Additionally, these known processes lead to the formation of very fine polymer particles (of the order of 1 micron), which are difficult to filtrate and to reprocess.

Consequently, the present invention aims to provide a recycling process and which allows plastics of high purity and advantageous morphology to be recovered, while substantially preventing any additives from being extracted therefrom.

More specifically, the present invention relates to a process for recycling an article based on at least one vinyl chloride polymer, in which:

(a) the article is shredded into fragments having an average dimension of 1 cm to 50 cm, should it exceed these dimensions;

(b) the fragments of the article, which are substantially dry, are brought into contact with a substantially anhydrous solvent capable of dissolving the vinyl chloride polymer, forming an azeotrope with water;

(c) the polymer dissolved in the solvent is precipitated by injecting steam in the solution thus obtained, which moreover leads to the stripping of the water-solvent azeotrope and so leaves behind a mixture essentially consisting of water and of solid polymer particles;

(d) the polymer particles are recovered.

The articles in question may be of any kind, as long as they essentially consist of one or more vinyl chloride (VC) polymers. VC polymer should be understood to mean any homopolymer or copolymer containing at least 50% by weight of VC. Polyvinyl chloride (PVC), i.e. a homopolymer, is generally used. Apart from one or more VC polymers, the articles may also contain one or more of the usual additives such as, for example, plasticizers, stabilizers, antioxidants, fire retardants, pigments, fillers, etc., including reinforcing fibres, for example glass fibres or fibres of a suitable plastic, such as a polyester.

The articles may be in any form, for example in the form of flexible pipes or hoses or rigid pipes, containers, sheets for covering soils, tarpaulins, window frames insulating sheaths of power cables, etc. They may have been manufactured by any known technique: extrusion, coating, injection moulding, etc.

The term "sheet" should be understood to mean any thin, flexible or rigid, single-layer or multilayer article, which may or may not be reinforced by reinforcing fibres embedded in the plastic. These sheets have any thickness, however this is generally less than 10 mm; their thickness is usually between 0.1 and 5 mm. The process is particularly advantageous for recycling tarpaulins, i.e. fibre-reinforced sheets, intended especially for covering vehicles, for concealing buildings on which work is being carried out, for the construction of sets for entertainments or exhibitions, or for advertising purposes. The sheets may have been manufactured by any technique, for example by calendering or by coating; the reinforced sheets are often manufactured by coating a network of fibres by means of a plastisol and heating.

The articles do not necessarily have to be in the form of objects having a well-defined shape; the process applies equally well to articles in a liquid or pasty state, especially to sludge recovered when cleaning plants used for the manufacture of articles made from vinyl plastisols. Apart from one or more vinyl chloride polymers, these articles in a liquid or pasty state may also contain one or more solvents, for example white spirit.

The possible reinforcing fibres may be of any kind—natural or synthetic; glass fibres, cellulose fibres or plastic fibres may especially be used. Often these are plastic fibres, particularly polyester fibres. Polyethylene terephthalate (PET) gives good results, especially for the reinforcement of sheets used as tarpaulins. The diameter of the fibres is usually of the order of 10 to 100 $\mu$m. They are often long fibres, the length of which may be up to several meters. However, they may also be shorter fibres—ranging from a few millimeters to a few centimeters in length—possibly forming a woven fabric, a nonwoven fabric or a felt. By way of illustration, the fibres may represent from 1 to 40% of the weight of a reinforced sheet.

The first step (a) of the process according to the invention consists, if necessary, in shredding the articles so as to reduce them to small-sized fragments which are easy to handle. The average dimension of these fragments is preferably at least 2 cm. Moreover, it is advantageously at most 30 cm. It is clear that if the article is already in the form of fragments of suitable dimensions, the shredding step is superfluous.

Shredding by means of conventional machines such as low-speed twin-shaft grinders without a grid or high-speed knife-type grinders (with a speed of greater than approximately 400 rpm) do not generally give excellent results since these machines often transform any reinforcing fibres into a kind of wadding, which cannot easily be reused and/or disrupts the operation of the shredding machine.

Consequently, within the context of the present invention, a low-speed grinder with a grid is used, which is capable of shredding reinforced fibres, such as those described above, without causing excessive heating and which, with regard to any reinforcing fibres, prevents the formation of wadding while ensuring that they are fragmented in such a way that the average length of the fibre pieces is, however, at least 5 mm.

It has proved to be advantageous to use a shredding machine comprising two rotating shafts provided with partially imbricated knives rotating above and a short distance away from a grid (the central part of which is approximately in the form of a double cylinder sector) provided with perforations of an average dimension of the order of 1 to 10 cm (for example of round shape). These so-called main shafts rotate in opposite directions, preferably at a speed not exceeding 100 rpm. Associated with each of these two main shafts is an auxiliary shaft, which is also rotating and, which carries knives that are partially imbricated with respect to the knives of the corresponding main shaft. Each auxiliary shaft preferably rotates in a direction counter to that of the corresponding main shaft, at a speed not exceeding 150 rpm. These auxiliary shafts are intended to prevent fragments of articles remaining trapped between the main knives. Grinders of this type are especially sold by the company Untha.

The fragments of articles thus obtained are then subjected to the action of a solvent having several specific characteristics. This operation may be carried out in any suitable apparatus, especially one which takes into account the safety and environmental requirements, for example in a closed reactor exhibiting sufficient chemical resistance. The reaction mixture is preferably stirred. To prevent any fibres from sticking to the stirring means and disrupting their operation, an advantageous variant consists in carrying out the dissolving operation in a container in which a perforated rotary drum has been placed, this drum rotating at a moderate speed (preferably at least 100 rpm). The spindle of the drum is preferably approximately horizontal. If the article is reinforced with fibres, an additional advantage of such an apparatus is that, after most of the solvent has been extracted from this container, the drum may be rotated at high speed so as to "spin dry" the fibres that it contains. The container in which the dissolution and the precipitation are performed is designated as "the reactor" hereinafter.

The solvent used is a substance—or a mixture of substances—capable of dissolving the vinyl chloride polymer or polymers contained in the treated article. However, if the article is reinforced with fibres the solvent must not dissolve the reinforcing fibres. Surprisingly, it has been found that it is extremely important for the solvent used to be substantially anhydrous, i.e. to contain less than 8% (by weight) of water, without which the solvent power of the solvent may be reduced unacceptably. Of course, the same applies to the fragments of articles to be treated which, before they are subjected to the action of the solvent, must also be substantially dry. For this purpose, a drying step may advantageously be provided before and/or after any shredding.

It is also necessary, in the context of the process according to the invention, for the solvent used to be miscible with water, and to form an azeotrope with water. The solvent is advantageously chosen from methyl ethyl ketone (MEK), methyl isobutyl ketone and tetrahydrofuran. It is preferred to use MEK which forms, with water, an azeotrope containing (at atmospheric pressure) 11% water and 89% MEK (by weight).

The dissolving operation (step b) is carried out at any temperature, but the solvent must be liquid at this temperature, of course. It is preferred to operate at a temperature of between 20 and 100° C., preferably from 50 to 80° C. When the solvent is MEK, good results were obtained by dissolving at a temperature of 75° C. (±4° C.). It is advantageous to work in an inert atmosphere, for example in nitrogen.

The dissolving operation may be carried out at any pressure. However, it is preferred to carry out the operation at a pressure of from 2 to 10 bar, preferably from 2 to 4 bar. This allows the operation to be carried out at higher temperatures, preferably above 110° C. (without causing the solvent to boil) and thus to speed up the dissolving operation, which allows to recycle, per hour, the same quantity of article by using one (or many) reactor(s) having a smaller volume. An extremely important and surprising advantage of this variant of the process according to the invention is that the fact of working at pressure makes it possible to relax the requirements pertaining to the amount of water allowed during the dissolving operation. For example, by working at a pressure of 2.5 to 3 bar and at a temperature of about 115° C., good results were obtained using MEK containing up to 8% by weight of water as the solvent. This is very important since it is thus possible to reuse the solvent in the process without having to subject it to a thorough water removal process.

The amount of solvent to be used must be chosen so as to prevent the increase in viscosity caused by dissolving the polymer from disrupting the proper operation of the process (filtration, etc.). During the dissolving step (b) it is preferred for the amount of article not to exceed 200 g per liter of solvent, and in particular 100 g/l.

With a view to reusing the vinyl chloride polymer thus recovered, an advantageous variant of the process according to the invention consists in incorporating into the solvent, before or during the step of dissolving the polymer, one or more additives (stabilizers, plasticizers, etc.), the nature and amounts of which are tailored to the properties which it is desired to confer on the recycled polymer. In this case, it is desirable for the additive or additives thus incorporated to be soluble in the solvent used. However, any insoluble additives may be finely dispersed in the solvent.

Available after the dissolving step (b) is a mixture comprising, on the one hand, a liquid phase consisting of the solvent in which the polymer is dissolved and, on the other hand, any undissolved constituents, for example reinforcing fibres. Such constituents may be separated from the liquid phase, for example by filtration using a fabric or screen whose apertures have dimensions of the order of 0.1 to 10 mm.

If the article is reinforced with fibres, it is found that the fibres thus recovered are of high purity. In order to increase this purity, the fibres may optionally be subjected to a subsequent centrifuging and/or washing step, for example using the same solvent, for the purpose of removing any residual traces of polymer. The solvent which would have been used for the washing may advantageously be mixed with the fresh solvent used for the dissolving step; the fact that it contains traces of dissolved polymer does not in any way lessen the effectiveness of the dissolving operation. The fibres may be reused directly for the manufacture of plastic-based reinforced articles.

Apart from any fibres, this optional separation step also allows any "accessories" to be recovered, such as metal eyelets, labels, etc., which had been incorporated in the article and which would not have been removed therefrom before subjecting it to the process according to the invention. Likewise, any pieces of metallic conductor which would have remained in power cable sheaths may thus be removed. If necessary, the solvent containing the dissolved polymer may be filtered more finely with a view to removing any dust or other insoluble particles, for example using a fabric or screen, the apertures of which have dimensions of less than 200 /um, preferably less than 20 /um.

Consequently, the present invention relates in particular to a process, as described above, in which the article is reinforced with reinforcing fibres, the solvent is such that the fibres are substantially insoluble in it and, before the dissolved polymer is precipitated, the fibres are separated from the solvent containing the dissolved polymer.

An amount of steam (water vapour) sufficient to precipitate the dissolved polymer (step c) is then added to the solvent containing the dissolved polymer. A large excess of water with respect to the azeotropic composition is preferably added. For example, in the case of MEK, from 1 to 3 kg of water per kg of MEK are generally added. This injection of steam causes the vinyl chloride polymer to precipitate in the form of solid particles (which are still substantially exempt of additives at this stage), of which the mean dimensions are about 1 micron.

The injection of steam also has the effect of provoking the evaporation and the stripping of the water-steam azeotrope, in the gaseous form, out of the reactor containing the solution. This azeotrope can then be recovered and condensed. This remaining mixture (which was not evaporated) consists essentially of water and solid polymer particles. As long as the solution still contains some solvent, the temperature of the gaseous phase above the solution remains approximately equal to the boiling temperature of the azeotrope (for instance, the boiling temperature of the MEK-water azeotrope under room pressure is about 73.5° C.).

As soon as the concentration of the solvent in the solution becomes sufficiently low, the additives dissolved in the solution are (re)deposited on the polymer particles. Very advantageously, this contributes to their agglomeration in pellets (agglomerates) having mean dimensions in the order of 500 $\mu$m, which will be very easy to filter, to handle and to reprocess thereafter (contrary to particles of about 1 micron). Surprisingly, it was noted that these polymer pellets (agglomerates) have a very satisfactory morphology, and in particular a very narrow granulometry.

Once most of the solvent has been stripped, the temperature of the gaseous phase increases to about 100° C. (under room pressure), which is an easy way of detecting that most of the solvent has been eliminated. This detection can also be based on the fact that the temperature of the solution (liquid phase) increases progressively towards 100° C. (under room pressure) while the concentration of the solvent is reduced.

Once the solution is substantially solvent-free, it is however advantageous to maintain its temperature at about 100° C. (for example by still injecting steam) during at least 5 minutes, and preferably at least 10 minutes. Surprisingly, this has a very favorable influence upon the properties and the morphology of the polymer pellets (agglomerates) (hardness, granulometry, apparent density, porosity, . . . ).

A very important advantage of eliminating the solvent (more precisely the water-solvent azeotrope) by using steam is that most of the additives present in the polymer to be recycled are not stripped off with the solvent, and are redeposited on the polymer particles. Therefore, the polymer particles recovered at the end of the process still contain a large fraction of the additives that the polymer initially contained (at least those of these additives which are soluble in the solvent; this does not generally affect any fillers, for example). This situation is particularly advantageous given that these additives are often expensive and that, furthermore, the said particles may be reused directly in a process for manufacturing articles based on this polymer. This process of reusing the particles thus recovered is facilitated by the fact that they are pre-gelled, thereby simplifying the processing compared with the processing of a heterogeneous mixture of polymer granules and separately added additives.

The known recycling processes by dissolution-precipitation do not have this advantage, since they lead to the extraction of most of the additives of the polymer.

An additional advantage of injecting steam is that this removes the need of an external heating of the reactor where the process is performed. This advantage is very important from an industrial point of view: indeed, an external heating would lead to polymer incrustations on the inner wall of said reactor, requiring a frequent cleaning. On the contrary, in the process of the invention, the injection of steam allows the reactor wall to find itself at a moderate temperature, which substantially reduces the risks of incrustations.

Another advantage of the process according to the invention is that the possible emulsifiers contained in the polymer to be recycled are dissolved in the water contained in the solution, so that the polymer particles recovered at the end of the process are substantially free of emulsifiers, which eases their reprocessing. In particular, deposits on the processing equipment are avoided, as well as the formation of bubbles on the surface of the new products thus obtained.

The (agglomerated) polymer particles may then be easily recovered (step d), for example by filtering the water/particle mixture, and optionally dried before being stored or reused.

Given the cost of the solvent and the drawbacks that its discharge into the environment could have, it is desirable to treat the azeotropic fraction so as to recover the solvent therefrom.

According to a preferred variant, the azeotrope recovered in step (e) is treated by adding to it a separating agent which causes it to settle into an aqueous phase and a phase essentially consisting of solvent. (It goes without saying that the azeotrope must be in the liquid state before being subjected to this settling operation. A condensation step may be provided for this purpose.) The separating agent is preferably soluble in water. The separating agent is advantageously a salt which is insoluble in the solvent. Sodium chloride (NaCl) or calcium chloride ($CaCl_2$) may especially be used, the latter being preferred. This choice in particular gives good results when the solvent is MEK. The separating agent may be used in the solid state or in aqueous solution. The latter option is particularly advantageous insofar as, after this separation step, the aqueous phase contains this dissolved agent; it may thus be directly reused (after optionally reconcentrating it, for example by evaporating the water) as the separating agent in a closed loop.

Large amounts of separating agent are recommended for the purpose of reducing as much as possible the amount of residual water present as a mixture in the solvent thus recovered (as explained above, the solvent used during the dissolving step must be substantially anhydrous). For example, in the case of the separation of an MEK/water azeotropic mixture using $CaCl_2$, greater amounts than 20 g of $CaCl_2$ per 100 g of water have proved to be necessary for reducing the residual azeotrope content in the MEK fraction separated after a settling time of one hour (at a temperature of 20 to 60° C.) to less than 10% (by weight). This reduction is important in the context of reusing the solvent in the process according to the invention, given that the solvent used for dissolving the polymer must be substantially anhydrous.

When the solvent is MEK, it is also possible to use, as another separating agent, 1-propanol. If this variant is adopted, the preferred operating method consists in injecting, preferably hot, the solvent containing the polymer dissolved in propanol, in evaporating the solvent, with entrainment of most of the 1-propanol, and then in filtering and drying the polymer particles formed. The propanol may be separated from the solvent, for example by distillation, and reused.

The process according to the invention may be carried out continuously or as a batch process, the latter variant being preferred.

A major advantage of the said process is that it may be carried out in a closed loop, without any polluting material being discharged, given that both the solvent and any agent for separating the solvent/water mixture may be recycled and reused in the process.

DESCRIPTION OF THE FIGURE

The appended FIGURE diagrammatically illustrates, in a non-limiting manner, the implementation of one particular variant of the process according to the invention, applied to the recycling of polyester-fibre-reinforced PVC tarpaulins.

The symbols used have the following meanings:

P: solid polymer F: fibres

S: solvent (p): dissolved polymer

W: water K: separating agent.

The tarpaulins are firstly shredded (SHRED) (step a) and then the polymer that they contain is dissolved (DISS) (step b) by the solvent S in which certain additives that it is desired to incorporate in the polymer may optionally have been dissolved. The mixture thus obtained is then filtered (FILT1), which allows the fibres F to be separated from a solution of the polymer in the solvent (S+(p)). The fibres are rinsed (RINSE) by means of solvent S and may then be spun, dried and stored or reused (steps not shown). After reconcentrating (CONC1) the solution S+(p), the polymer is precipitated (PREC) (step c) by injecting steam (VAP) in this solution, which also provokes the removal (stripping) of the solvent/water azeotrope. The solid particles (agglomerates) of polymer P are separated by filtration (FILT2) (step d) from the water W (which can be reused in PREC) and then dried (DRY). The azeotrope W+S, after it has been condensed (step not shown), is separated by settling (SETT) under the effect of a separating agent K dissolved in water, thereby providing, on the one hand, a solvent S fraction which can be reused and, on the other hand, an aqueous phase containing the settling agent (W+K), which may also be reused, optionally after it has been reconcentrated (CONC2). The water recovered from this reconcentration step may be removed or reused, for example (as steam) for precipitating the polymer (PREC).

The solvent recovered from the optional solution reconcentration step (CONC1) as well as that recovered by separating the azeotrope (SETT) may be reused in the polymer dissolving step (DISS), either directly or (as illustrated) indirectly, after it has served for rinsing (RINSE) the fibres F.

We claim:

1. A process for recycling an article based on at least one vinyl chloride polymer, in which:
    (a) the article is shredded into fragments having an average dimension of 1 cm to 50 cm, should it exceed these dimensions;
    (b) the fragments of the article, which are substantially dry, are dissolved in a substantially anhydrous solvent capable of forming an azeotropic composition with water;
    (c) the polymer dissolved in the solvent is precipitated by injecting an amount of steam in the solution thus obtained, the amount of steam being sufficient to create a large excess of water with respect to the azeotropic composition, which moreover leads to the stripping of the water-solvent azeotropic composition and so leaves behind a mixture essentially consisting of water and of solid polymer particles;
    (d) the mixture is allowed to reach the boiling point of water in order to become substantially solvent-free; and
    (e) the polymer particles are recovered.

2. The process according to claim 1, in which the dissolving step (b) is carried out in a container in which a perforated rotary drum is placed.

3. The process according to claim 1, in which the solvent is selected from the group consisting of methyl ethyl ketone (MEK), methyl isobutyl ketone and tetrahydrofuran.

4. The process according to claim 1, in which the dissolution step (b) is effected at a pressure of 2 to 10 bars.

5. The process according to claim 1, in which, during the dissolving step (b), the amount of article does not exceed 200 g per liter of solvent.

6. The process according to claim 1, in which the article is reinforced with reinforcing fibres, the solvent is such that the fibres are substantially insoluble in it and, before the dissolved polymer is precipitated, the fibres are separated from the solvent containing the dissolved polymer.

7. The process according to claim 1, in which the mixture of water and polymer particles is heated for the purpose of reducing the traces of solvent with which the polymer, before the latter is recovered (d), would still be impregnated.

8. The process according to claim 1, in which the azeotrope recovered in the step (c) is treated by adding to it a separating agent which causes it to settle into an aqueous phase and a phase essentially consisting of solvent.

9. The process according to claim 8, in which the separating agent is a salt insoluble in the solvent.

10. The process according to claim 1, in which the article is a sheet.

* * * * *